(12) United States Patent
Knoblauch

(10) Patent No.: US 12,268,108 B2
(45) Date of Patent: Apr. 8, 2025

(54) SYSTEM AND METHOD FOR DE-PLUGGING BASKET ASSEMBLIES OF AN AGRICULTURAL IMPLEMENT

(71) Applicant: CNH Industrial America LLC, New Holland, PA (US)

(72) Inventor: Joshua D. Knoblauch, Lowpoint, IL (US)

( * ) Notice: Subject to any disclaimer, the term of this patent is extended or adjusted under 35 U.S.C. 154(b) by 366 days.

(21) Appl. No.: 17/847,781

(22) Filed: Jun. 23, 2022

(65) Prior Publication Data

US 2023/0413703 A1 Dec. 28, 2023

(51) Int. Cl.
*A01B 29/06* (2006.01)
*A01B 29/04* (2006.01)
*A01B 79/00* (2006.01)

(52) U.S. Cl.
CPC ............ *A01B 29/06* (2013.01); *A01B 29/048* (2013.01); *A01B 79/00* (2013.01)

(58) Field of Classification Search
CPC ....... A01B 29/06; A01B 29/048; A01B 79/00; A01B 33/16; A01B 49/027
See application file for complete search history.

(56) References Cited

U.S. PATENT DOCUMENTS

| | | | | |
|---|---|---|---|---|
| 5,524,425 | A | * | 6/1996 | Gallazzini ............ A01B 45/026 56/364 |
| 5,601,145 | A | * | 2/1997 | Thompson ............. A01B 15/20 180/41 |
| 7,766,093 | B2 | | 8/2010 | Becker et al. |
| 7,806,197 | B2 | | 10/2010 | Steinlage et al. |
| 9,326,439 | B2 | * | 5/2016 | Westlind ................ A01B 27/00 |

(Continued)

FOREIGN PATENT DOCUMENTS

| | | |
|---|---|---|
| DE | 2912392 A1 | 10/1980 |
| EP | 0305220 B1 | 1/1995 |
| WO | WO2019/180472 | 9/2019 |

OTHER PUBLICATIONS

Summers Manufacturing, "Summers Manufacturing Shows New Rolling Basket with Internal Mud Scraper," Farm Progress Show 2013, Sep. 19, 2013, screen shot Mar. 20, 2020 (1 page) https://www.youtube.com/watch?v=wf_i5HOz618.

*Primary Examiner* — Jamie L McGowan
*Assistant Examiner* — Audrey L Lusk
(74) *Attorney, Agent, or Firm* — Rebecca Henkel; Peter K. Zacharias; Rickard DeMille

(57) ABSTRACT

An agricultural implement includes a frame and a basket assembly supported on the frame. The basket assembly, in turn, includes including a plurality of circumferentially arranged blades such that the basket assembly is configured to roll relative to a surface of a field as the agricultural implement travels across the field. Furthermore, the plurality of circumferentially arranged blades define a plurality of voids and at least partially defining an interior cavity within the basket assembly, with each void being defined between an adjacent pair of the plurality of circumferentially arranged blades. Additionally, the agricultural implement includes a bladder positioned within the interior cavity, with the bladder configured to be inflated and deflated such that the bladder expands and contracts relative to the plurality of circumferentially arranged blades to force field materials present within the interior cavity outward through the plurality of voids.

18 Claims, 7 Drawing Sheets

(56) References Cited

U.S. PATENT DOCUMENTS

| | | |
|---|---|---|
| 9,485,900 B2 * | 11/2016 | Connell ................. A01B 63/24 |
| 9,510,496 B2 | 12/2016 | Kovach et al. |
| 10,076,072 B2 | 9/2018 | Steinlage et al. |
| 10,251,322 B2 | 4/2019 | Westlind |
| 2009/0031685 A1 * | 2/2009 | Heitlinger ............ A01B 59/042 56/6 |
| 2011/0180283 A1 * | 7/2011 | Koplin ................... A01B 29/04 89/1.13 |
| 2013/0192855 A1 | 8/2013 | Meek |
| 2018/0228072 A1 | 8/2018 | Cresswell et al. |
| 2019/0239413 A1 | 8/2019 | Degarmo |
| 2019/0335646 A1 | 11/2019 | Cross et al. |

* cited by examiner

SYSTEM AND METHOD FOR DE-PLUGGING BASKET ASSEMBLIES OF AN AGRICULTURAL IMPLEMENT

FIELD OF THE INVENTION

The present disclosure generally relates to agricultural implements and, more particularly, to systems and methods for de-plugging basket assemblies of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging tools configured to engage the soil as the implement is moved across the field. For example, in certain configurations, the implement may include one or more harrow discs, leveling discs, rolling baskets, shanks, tines, and/or the like. Such ground engaging tool(s) loosen, agitate, and/or otherwise work the soil to prepare the field for subsequent planting operations.

During tillage operations, field materials, such as residue, soil, rocks, mud, and/or the like, may become trapped or otherwise accumulate on and/or within ground engaging tools or between adjacent ground engaging tools. For instance, material accumulation will often occur around the exterior of a basket assembly (e.g., on the blades or bars of the basket assembly) and/or within the interior of the basket assembly. Such accumulation of field materials may prevent the basket assembly from performing in a desired manner during the performance of a tillage operation. In this respect, systems have been developed for de-plugging basket assemblies. However, while such systems work well, further improvements are needed.

Accordingly, an improved system and method for de-plugging basket assemblies of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement. The agricultural implement includes a frame and a basket assembly supported on the frame. The basket assembly, in turn, includes including a plurality of circumferentially arranged blades such that the basket assembly is configured to roll relative to a surface of a field as the agricultural implement travels across the field. Furthermore, the plurality of circumferentially arranged blades define a plurality of voids and at least partially defining an interior cavity within the basket assembly, with each void being defined between an adjacent pair of the plurality of circumferentially arranged blades. Additionally, the agricultural implement includes a bladder positioned within the interior cavity, with the bladder configured to be inflated and deflated such that the bladder expands and contracts relative to the plurality of circumferentially arranged blades to force field materials present within the interior cavity outward through the plurality of voids.

In another aspect, the present subject matter is directed to a system for de-plugging basket assemblies of an agricultural implement. The system includes a basket assembly having a plurality of circumferentially arranged blades such that the basket assembly is configured to roll relative to a surface of a field as the agricultural implement travels across the field. Moreover, the plurality of circumferentially arranged blades define a plurality of voids and at least partially defining an interior cavity within the basket assembly, with each void being defined between an adjacent pair of the plurality of circumferentially arranged blades. In addition, the system includes a bladder positioned within the interior cavity, with the bladder configured to be inflated and deflated such that the bladder expands and contracts relative to the plurality of circumferentially arranged blades to force field materials present within the interior cavity outward through the plurality of voids.

In a further aspect, the present subject matter is directed to a method for de-plugging basket assemblies of an agricultural implement. The agricultural implement, in turn, includes a basket assembly and a bladder positioned within the basket assembly, with the bladder configured to be inflated and deflated such that the bladder expands and contracts relative to the basket assembly. The method includes controlling, with a computing system, an operation of the agricultural implement as the agricultural implement travels across the field. Furthermore, the method includes receiving, with the computing system, sensor data indicative of plugging of the basket assembly. Additionally, the method includes controlling, with the computing system, an operation of at least one of a pump or a valve to inflate or deflate the bladder based on the received sensor data.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
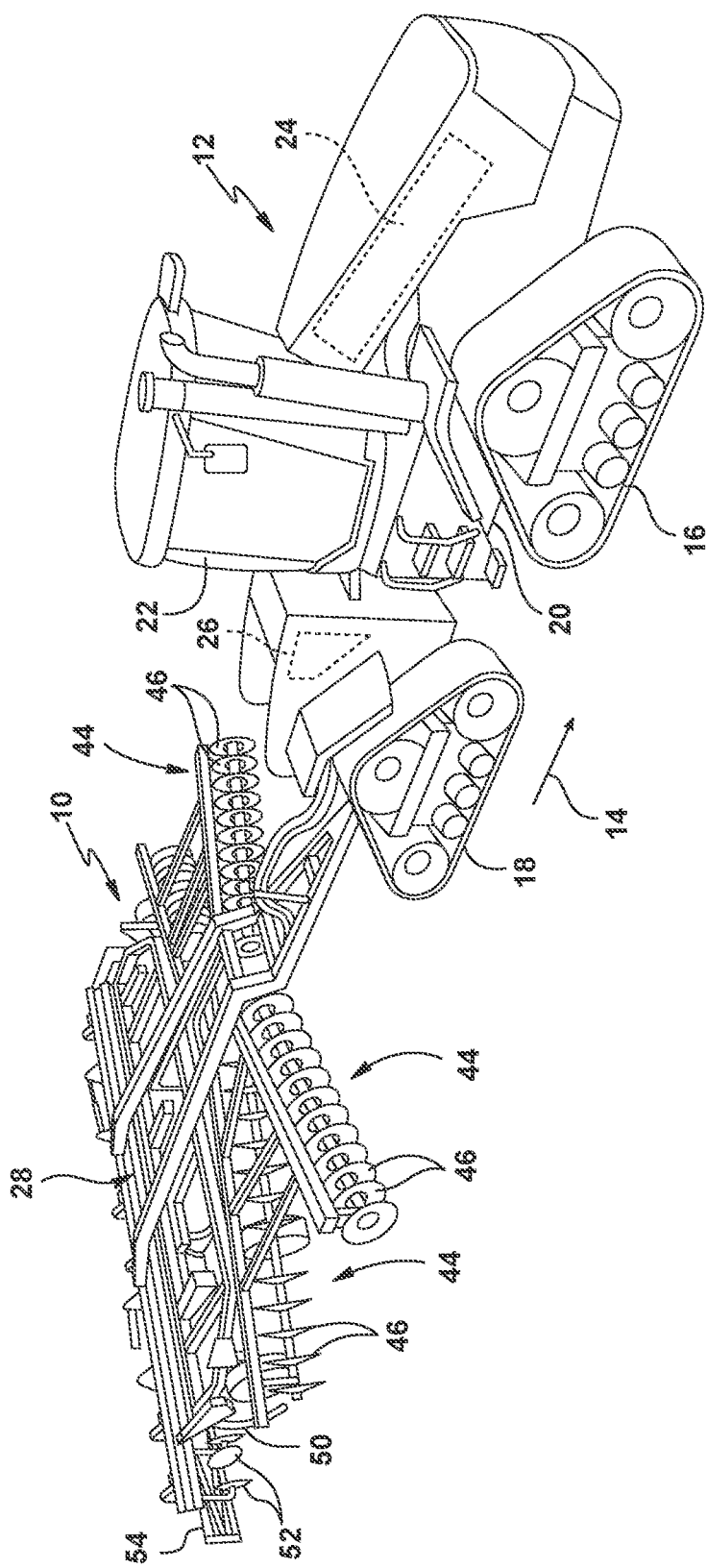
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and a method for de-plugging basket assemblies of an agricultural implement. As will be described below, the agricultural implement includes a basket assembly supported on its frame at an aft end thereof. Specifically, the basket assembly includes a plurality of circumferentially arranged blades or bars such that the basket assembly is configured to roll relative to the surface of a field as the agricultural implement travels across the field, such as when performing an agricultural operation thereon. In this respect, the rolling of the basket assembly may break up soil clods present within the field to level and smooth the field surface. Furthermore, the basket assembly defines an interior cavity and a plurality of voids. Specifically, each void is defined between an adjacent pair of the circumferentially arranged blades.

In several embodiments, the system includes a bladder positioned within the interior cavity. The bladder is, in turn, configured to be inflated and deflated such that the bladder expands and contracts relative to the circumferentially arranged blades. For example, in some embodiments, when it is determined that the basket assembly is plugged with field materials or debris (e.g., residue, soil, etc.), the bladder may be inflated within the interior cavity. Such inflation of the bladder may force field materials present within the interior cavity outward through the plurality of voids, thereby de-plugging the basket assembly. Thereafter, when it is determined that the basket assembly has been de-plugged, the bladder may be deflated.

The bladder positioned within the basket assembly improves the operation of the agricultural implement. More specifically, during agricultural operations, basket assemblies on agricultural implements may be become plugged with field materials and/or debris. When plugged, the basket assembly becomes ineffective and the trapped field materials must be removed. Current systems rely of scrapper blades to remove accumulated field. Such scrapper blades can only scrap material off of a single surface. However, as described above, in the disclosed system, the bladder can be inflated such that the bladder expands radially relative to the basket assembly when the basket assembly is plugged. Such expansion of bladder forces the accumulated materials out of the interior cavity of the basket assembly and through the voids around the entire circumference of the basket assembly, thereby more quickly and thoroughly de-plugging the basket assembly.

Figure 2:
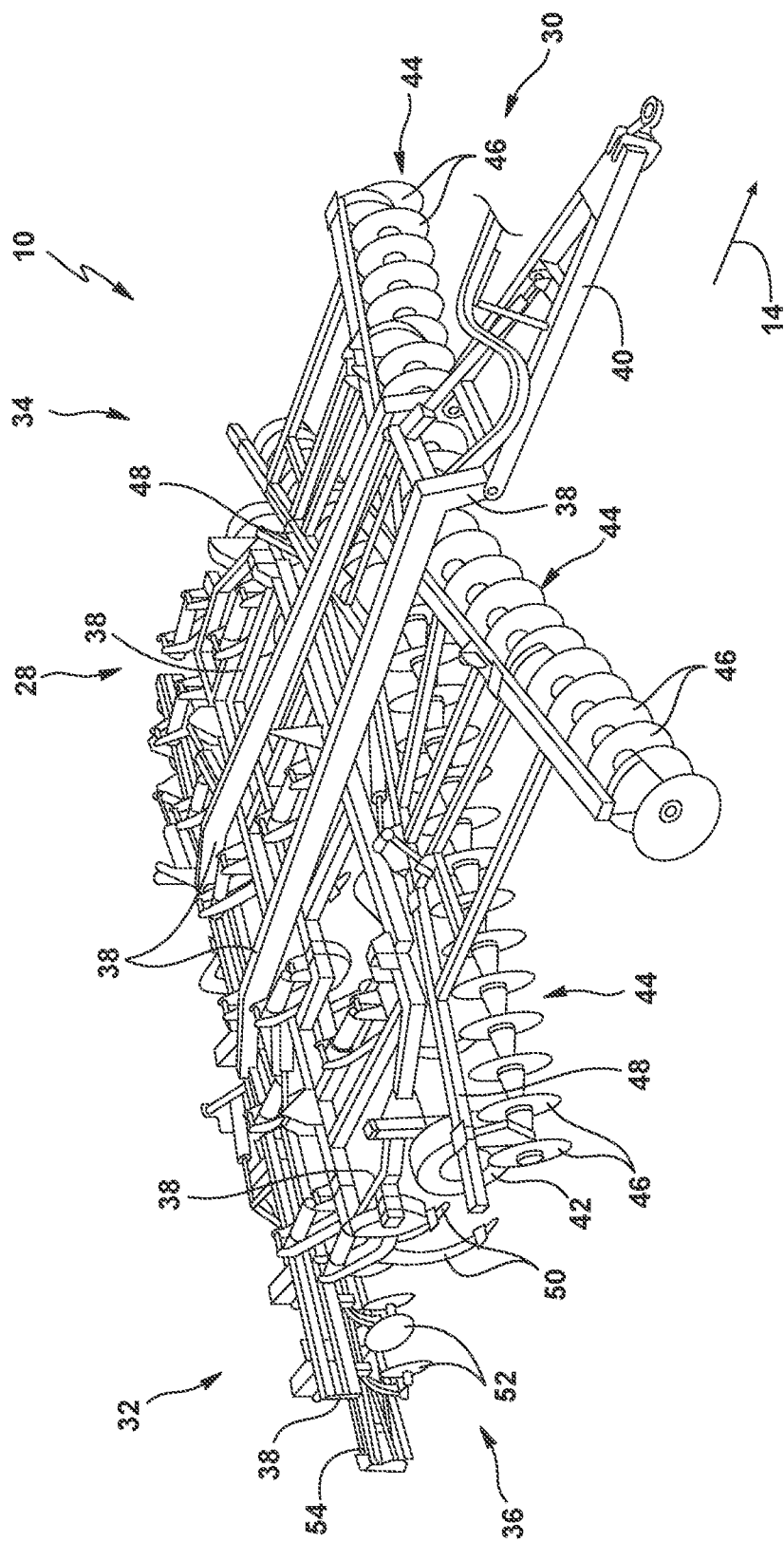
FIG. 2 illustrates another perspective view of the agricultural implement shown in FIG. 1.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 is configured as a tillage implement, and the work vehicle 12 is configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 includes a frame 28. More specifically, as shown in FIG. 2, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support various ground engaging tools. For instance, the frame 28 may support one or more gangs or sets 44 of disk blades 46. Each disk blade 46 may be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Additionally, as shown, in one embodiment, the implement frame 28 may be configured to support other ground engaging tools. For instance, in the illustrated embodiment, the frame 28 is configured to support a plurality of shanks 50 configured to rip or otherwise till the soil as the implement 10 is towed across the field. Furthermore, in the illustrated embodiment, the frame 28 is also configured to support one or more finishing tools, such as a plurality of leveling blades 52 and/or rolling (or crumbler) basket assemblies 54. However, in other embodiments, any other suitable ground-engaging tools may be coupled to and supported by the implement frame 28, such as a plurality of closing discs.

Figure 3:
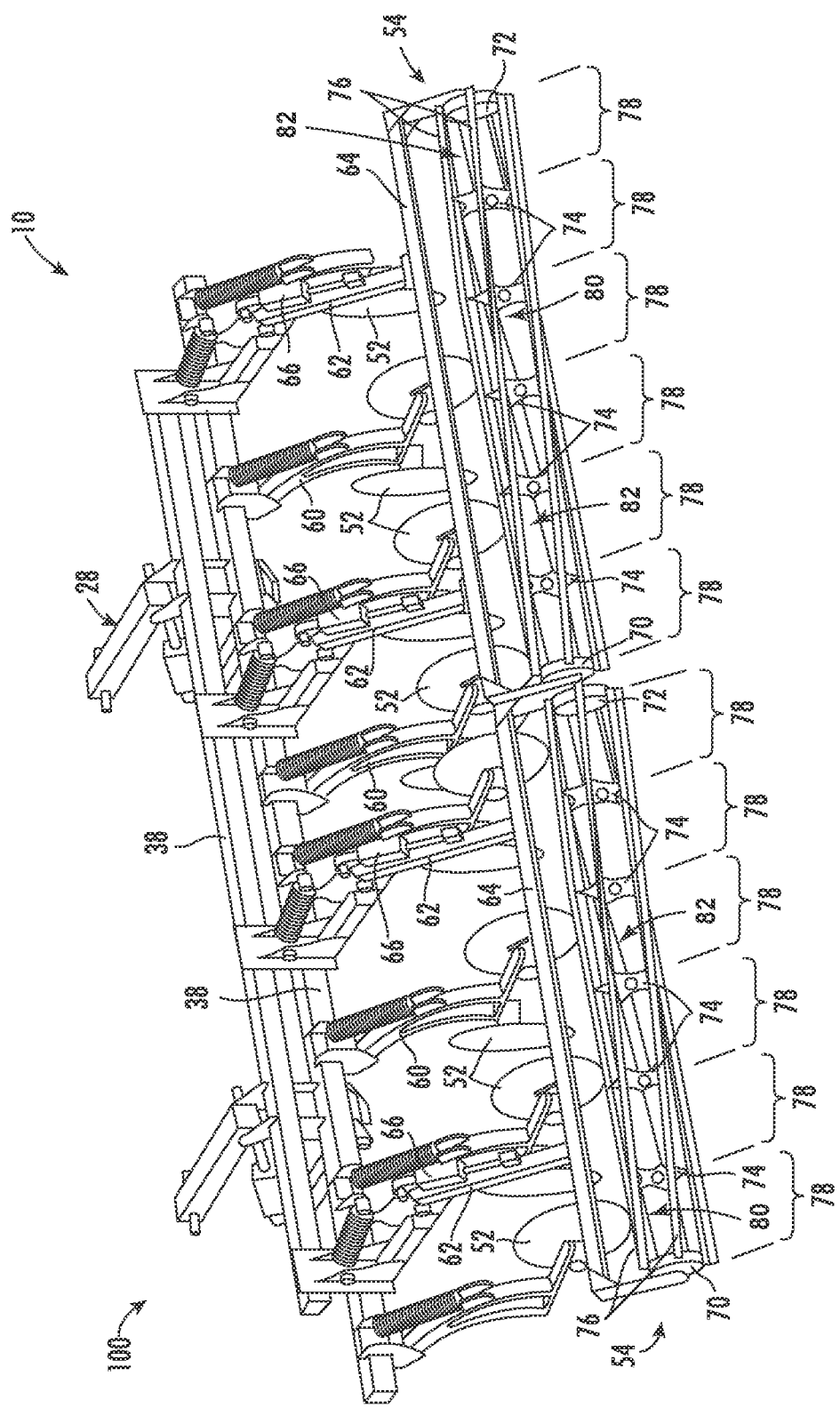
FIG. 3 illustrates a partial perspective view of basket assemblies positioned at an aft end of the agricultural implement shown in FIGS. 1 and 2.

Referring now to FIG. 3, a partial, perspective view of the aft end of the implement 10 shown in FIGS. 1 and 2 is illustrated in accordance with aspects of the present subject matter, particularly illustrating a portion of the finishing tools 52, 54 of the implement 10. As shown, the various finishing tools 52, 54 may be coupled to or supported by the implement frame 28, such as by coupling each tool to a toolbar or laterally extending frame member 38 of the frame 28. For instance, as shown in FIG. 3, a blade support arm 60 may be coupled between a given frame member 38 and each leveling blade 52 or set of leveling blades 52 to support the blades 52 relative to the frame 28. Similarly, one or more basket support arms 62 may be coupled between a given frame member 38 and an associated mounting yoke or basket hanger 64 for supporting each basket assembly 54 relative to the frame 28. Additionally, as shown in FIG. 3, in one embodiment, a basket actuator 66 (e.g., a hydraulic or pneumatic cylinder) may be coupled to each basket support arm 62 to allow the down force or down pressure applied to each basket assembly 54 to be adjusted. The basket actuators 66 may also allow the basket assemblies 54 to be raised off the ground, such as when the implement 10 is making a headland turn and/or when the implement 10 is being operated within its transport mode.

In several embodiments, each basket assembly 54 includes a plurality of support plates 70, 72, 74 configured to support a plurality of circumferentially arranged blades or bars 76 spaced circumferentially about the outer perimeter of the basket assembly 54. For instance, as shown in FIG. 3, each basket assembly 54 includes first and second end plates 70, 72 positioned at the opposed lateral ends of the basket assembly 54 and a plurality of inner support plates 74 spaced apart laterally from one another between the end plates 70, 72. Lateral basket sections 78 are generally defined between each pair of adjacent support plates 70, 72, 74, with each basket section 78 generally defining a hollow or substantially hollow interior cavity surrounded by the lateral portions of the blades 76 extending between the respective pair of adjacent support plates 70, 72, 74. Additionally, each basket assembly 54 generally defines a plurality of voids 82, with each individual void 82 being defined between a pair of adjacent blades 76. Thus, the voids 82 provide access to the interior cavity 80. Moreover, the end plates 70, 72 may be rotatably coupled to the corresponding basket hanger 64 (which, in turn, is coupled to the associated bracket support arm(s) 62) via bearings to allow the basket assembly 54 to rotate relative to the hanger/arm 64, 62 and the field surface as implement 10 is being moved across the field.

It should be further appreciated that the configuration of the agricultural implement 10 and the work vehicle 12 described above and shown in FIGS. 1-3 is provided only to place the present subject matter in an exemplary field of use. Thus, it should be appreciated that the present subject matter may be readily adaptable to any manner of implement and/or vehicle configuration.

Figure 4:
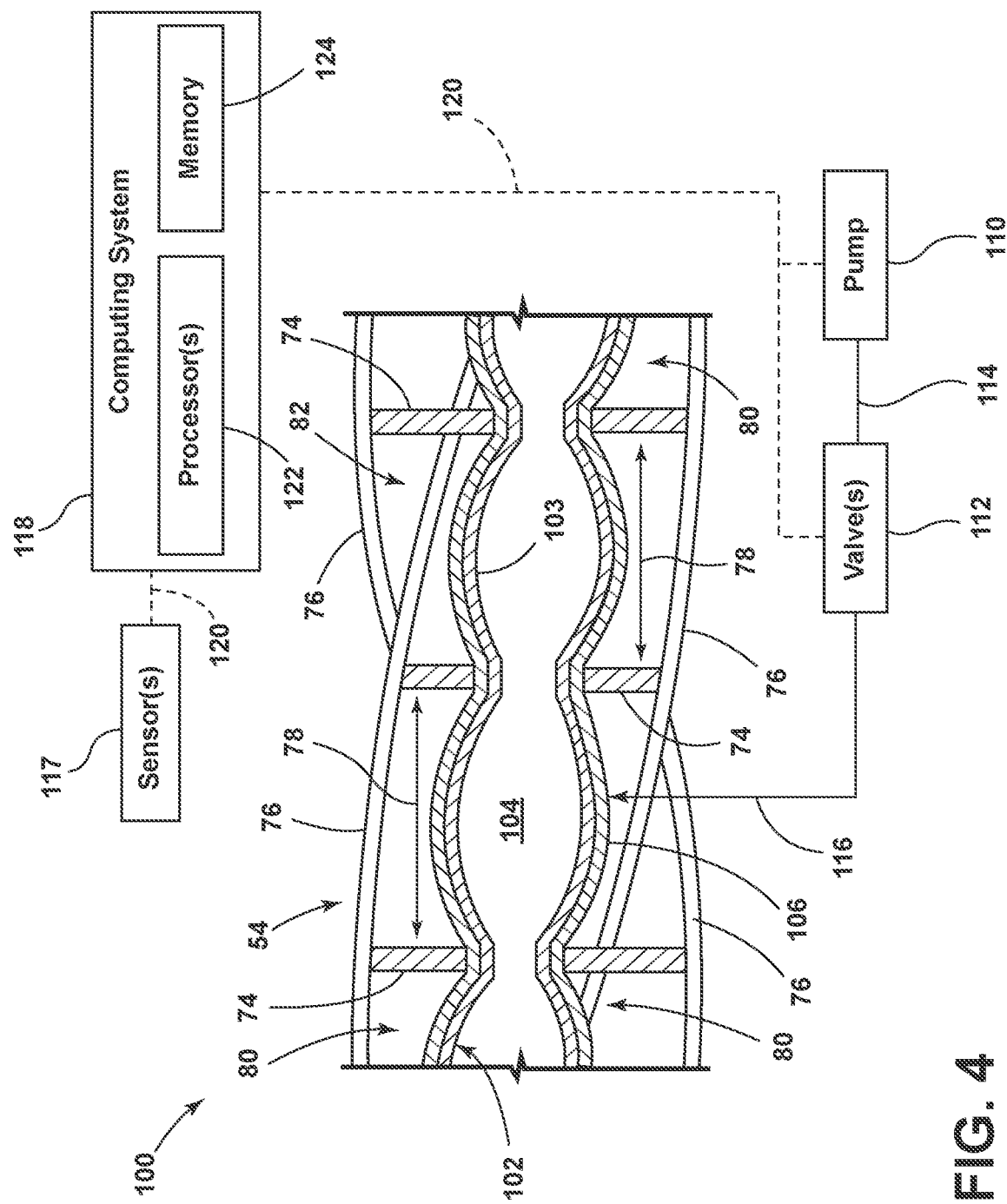
FIG. 4 illustrates a schematic view of one embodiment of a system for de-plugging basket assemblies of an agricultural implement in accordance with aspects of the present subject matter.

Referring now to FIG. 4, a schematic view of one embodiment of a system 100 for de-plugging basket assemblies of an agricultural implement is illustrated in accordance with aspects of the present subject matter. In general, the system 100 will be described herein with reference to the agricultural implement 10 and the work vehicle 12 described above with reference to FIGS. 1-3. However, it should be appreciated by those of ordinary skill in the art that the disclosed system 100 may generally be utilized with agricultural implements having any other suitable implement configuration and/or with work vehicles having any other suitable vehicle configuration.

As shown in FIG. 4, the system 100 includes a bladder 102 positioned within a basket assembly 54 of the agricultural implement 10. More specifically, the bladder 102 is positioned inside of the blades 76 of the basket assembly 54 such that the bladder 102 is positioned within the interior cavity(ies) 80 of the basket assembly 54. In this respect, the bladder 102 is configured to be inflated and deflated such that the bladder 102 expands and contracts relative to the blades 76. As will be described below, when the bladder 102 is inflated, the field materials (e.g., soil, residue, debris, etc.) present within the interior cavity(ies) 80 are forced outward through the plurality of voids 82, thereby de-plugging the basket assembly 54.

The bladder 102 may have any suitable construction that allows the bladder 102 to expand and contract as described herein. Specifically, in several embodiments, the bladder 102 may be formed from an elastomeric tubular member 103 defining an air chamber 104 therein. In this respect, pressurized air may be supplied to the air chamber 104 of the bladder 102, thereby causing the tubular member 103 to expand outward (e.g., radially). Thus, the tubular member 103 may stretch when inflated such that the exterior surface of the tubular member 103 moves closer to the blades 76. Such expansion, in turn, shrinks or otherwise reduces the volume of the interior cavity(ies) 80 of the basket assembly 54, thereby forcing field material within the interior cavity(ies) 80 outward through the voids 82.

As shown, in some embodiments, a portion of the bladder 102 may expand outward within each lateral basket section 78 when inflated. More specifically, in such embodiments, the bladder 102 is configured to expand and contract relative to the plurality of support plates 70, 72, 74 when inflated and deflated. In this respect, when inflated, the portions of the bladder 102 that are positioned laterally between the support plates 70, 72, 74 expand outward. Conversely, the portions of the bladder 102 that are laterally aligned with the support plates 70, 72, 74 do not expand outward when the bladder 102 is inflated as the support plates 70, 72, 74 do not provide clearance for such expansion.

In addition, the bladder 102 may be formed of any suitable elastomeric material, including woven and non-woven materials. For example, such elastomeric materials may include nitrile, nylon, polyurethane, polyester, polyethylene, polyvinylchloride, and/or the like.

Furthermore, in one embodiment, a sleeve 106 may be positioned around the exterior of the bladder 102. In this respect, the sleeve 106 is configured to protect the bladder 102 from damage (e.g., puncture) due to contact with rocks, residue, and other debris. As such, the sleeve 106 may be formed of any suitable material capable of protecting the bladder 102 from damage, such as a para-aramid.

Additionally, although the system 100 will be described in the context of a single bladder 102 for simplicity, the system 100 may include any suitable number of bladders 102. For example, in one embodiment, the system 100 may include one bladder 102 positioned within each of the basket assemblies 54 of the agricultural implement 10.

Moreover, the system 100 may include any suitable components for inflating and deflating the bladder 102. Specifically, in several embodiments, the system 100 includes a pump 110 configured to generate pressurized air to inflate the bladder 102. Furthermore, in such embodiments, the system 100 may include one or more valves 112 configured to control the flow of the pressurized air to and/or from the bladder 102. For example, the valve(s) 112 may selectively allow pressurized air to flow from the pump 110 or a storage tank (not shown) to the bladder 102 to inflate the bladder 102. Additionally, or alternatively, the valve(s) 112 may selectively allow pressurized air to be released from the bladder 102 to deflate the bladder 102. In addition, the system 100 may include any suitable fluid conduits, such as fluid conduits 114, 116, to route the pressurized air to and/or from the bladder 102.

Furthermore, the system 100 may include one or more sensors 117 for use in detecting plugging of the basket assembly 54. Specifically, in several embodiments, the sensor(s) 117 may be coupled to and/or supported on the implement or the vehicle 12 such that the sensor(s) 117 has a field of view or detection zone directed toward the basket assembly 54 and/or a portion of the field across which the basket assembly 54 is being moved during the performance of an agricultural operation. As such, the sensor(s) 117 may be configured to generate data indicative of plugging of the basket assembly 54 as the implement 10 is moved across the field. For example, in one embodiment, the sensor(s) 117 may be configured to generate data indicative of the amount of field materials (e.g., soil, residue, and/or the like) that has accumulated on the blades 76 of the basket assembly 54 and/or within the interior cavity(ies) 80 of the basket assembly 54. As will be described below, by analyzing the data generated by the sensor(s) 117, it can be determined when the basket assembly 54 is plugged. As indicated above, the basket assembly 54 may be plugged when the accumulation of field materials is sufficient to inhibit the performance of the agricultural operation being performed by the basket assembly 54. When it is determined that the basket assembly 54 is plugged, the bladder 102 may be inflated to de-plug the basket assembly 54.

In general, the sensor(s) 117 may correspond to any suitable sensing device(s) configured to detect or generate data indicative of the plugging of the basket assembly 54. In several embodiments, the sensor(s) 117 may correspond to a suitable vision-based sensor(s) configured to capture images or other vision-based data of the basket assembly 54 and/or the portion of the field adjacent to the basket assembly 54. As such, the amount of field materials that has accumulated on and/or adjacent to the basket assembly 54 may be calculated or estimated by analyzing the content of each image. For instance, in one embodiment, the sensor(s) 117 may correspond to a stereographic camera(s) having two or more lenses with a separate image sensor for each lens to allow the camera(s) to capture stereographic or three-dimensional images. In a further embodiment, the sensor(s) 117 may correspond to any other suitable sensing device(s) configured to detect or capture data indicative of plugging of the basket assembly 54, such as a radar sensor, an acoustic sensor, an electromagnetic sensor, and/or the like.

The system 100 may include any number of sensors 117 configured to generate data indicative of plugging of any number of basket assemblies 54 of the implement 10. For example, in one embodiment, the implement 10 may include a plurality of sensors 117, which each sensor 117 configured to generate data indicative of plugging of one of the basket assemblies 54.

Additionally, the system 100 includes a computing system 118 communicatively coupled to one or more components of the agricultural implement the work vehicle 12, and/or the system 100 to allow the operation of such components to be electronically or automatically controlled by the computing system 118. For instance, the computing system 118 may be communicatively coupled to the sensor(s) 117 via a communicative link 120. As such, the computing system 118 may be configured to receive data from the sensor(s) 117 that is indicative of plugging of the basket assembly 54 of the implement 10. Furthermore, the computing system 118 may be communicatively coupled to the pump 110 and/or the valve(s) 112 via the communicative link 120. In this respect, the computing system 118 may be configured to control the operation of the pump 110 and/or the valve(s) 112 to inflate and/or deflate the bladder 102. In addition, the computing system 118 may be communicatively coupled to any other suitable components of the agricultural implement 10, the work vehicle 12, and/or the system 100.

In general, the computing system 118 may comprise one or more processor-based devices, such as a given controller or computing device or any suitable combination of controllers or computing devices. Thus, in several embodiments, the computing system 118 may include one or more processor(s) 122 and associated memory device(s) 124 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 124 of the computing system 118 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 124 may generally be configured to store suitable computer-readable instructions that, when implemented by the processor(s) 122, configure the computing system 118 to perform various computer-implemented functions, such as one or more aspects of the methods and algorithms that will be described herein. In addition, the computing system 118 may also include various other suitable components, such as a communications circuit or module, one or more input/output channels, a data/control bus and/or the like.

The various functions of the computing system 118 may be performed by a single processor-based device or may be distributed across any number of processor-based devices, in which instance such devices may be considered to form part of the computing system 118. For instance, the functions of the computing system 118 may be distributed across multiple application-specific controllers or computing devices, such as a navigation controller, an engine controller, a transmission controller, an implement controller, and/or the like.

Figure 5:
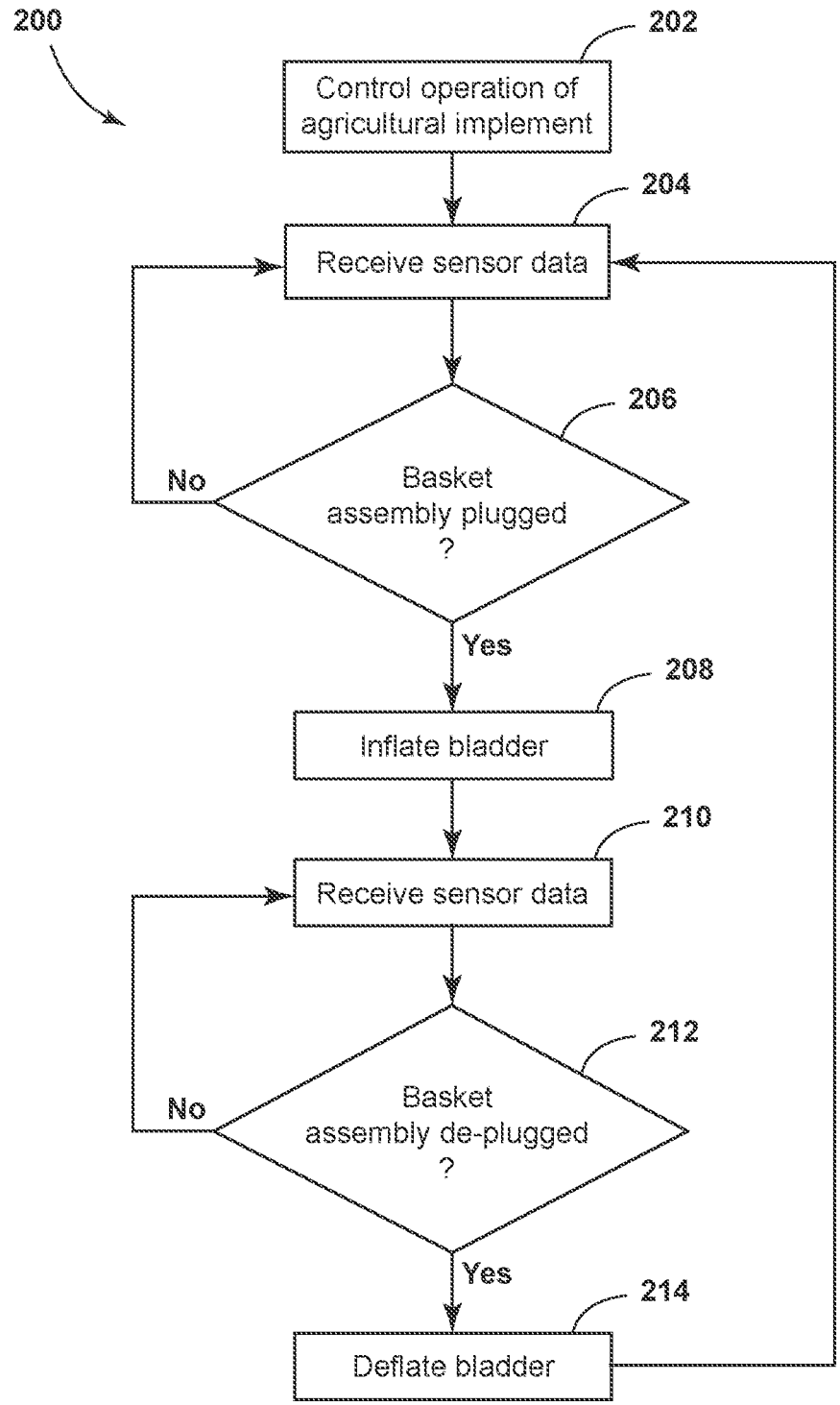
FIG. 5 illustrates a flow diagram providing one embodiment of control logic for de-plugging basket assemblies of an agricultural implement in accordance with aspects of the present subject matter.

Referring now to FIG. 5, a flow diagram of one embodiment of control logic 200 that may be executed by the computing system 118 (or any other suitable computing system) for de-plugging basket assemblies of an agricultural implement is illustrated in accordance with aspects of the present subject matter. Specifically, the control logic 200 shown in FIG. 5 is representative of steps of one embodiment of an algorithm that can be executed to de-plug a basket assembly of an agricultural implement quickly and thoroughly. Thus, in several embodiments, the control logic 200 may be advantageously utilized in association with a system installed on or forming part of an agricultural implement and/or work vehicle to allow for real-time de-plugging of basket assemblies without requiring substantial computing resources and/or processing time. However, in other embodiments, the control logic 200 may be used in association with any other suitable system, application, and/or the like for de-plugging basket assemblies of an agricultural implement.

Figure 6:
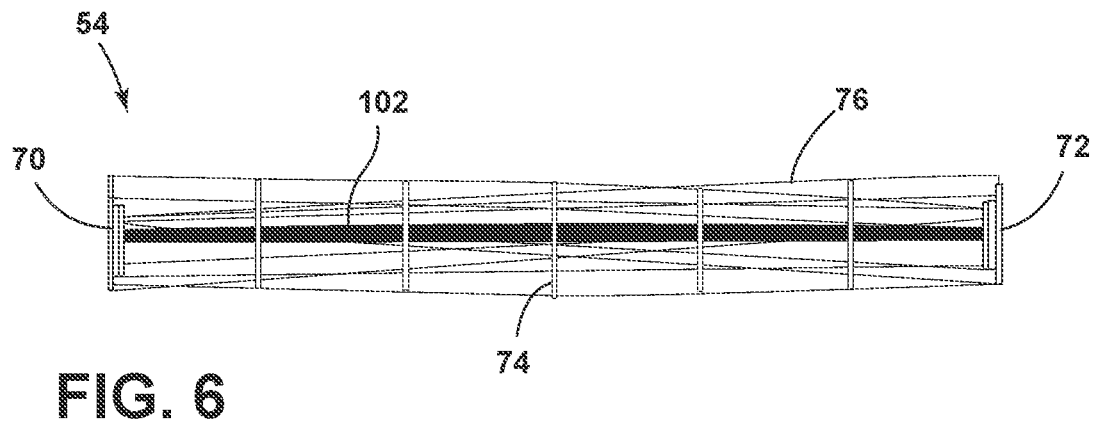
FIG. 6 illustrates a diagrammatic view of one embodiment of a bladder positioned within a basket assembly of an agricultural implement in accordance with aspects of the present subject matter, particularly illustrating the bladder being in a deflated state.
Figure 7:
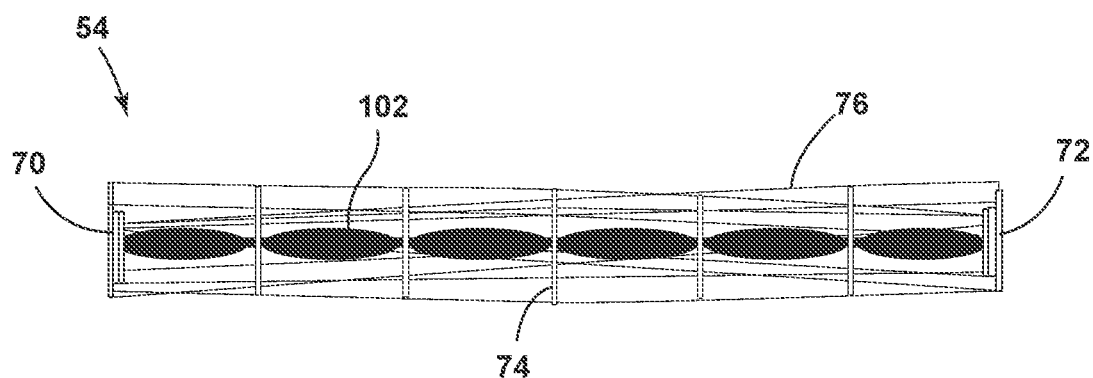
FIG. 7 illustrates a diagrammatic view of one embodiment of a bladder positioned within a basket assembly of an agricultural implement in accordance with aspects of the present subject matter, particularly illustrating the bladder being inflated to a first inflation level.

As shown in FIG. 5, at (202), the control logic 200 includes controlling the operation of the agricultural implement as the agricultural implement travels across the field. Specifically, in several embodiments, the computing system 118 may be configured to control the operation of the agricultural implement 10 as the implement travels across a field in a direction of travel 14, such as to perform an agricultural operation thereon. As the implement 10 travels across the field, the basket assembly(ies) 54 may roll relative to the surface of the field, thereby braking up soil clods present on the field surface. In this respect, the computing system 118 may control the operation of the basket actuators 66 to maintain a selected force or down pressure being applied to the basket assembly(ies) 54. In some embodiments, the computing system 118 may be configured to control the operation of the pump 110 and/or the valve(s) 112 such that the bladder 102 within each basket assembly 54 is in a deflated state as shown in FIG. 6 during normal, de-plugged operation. Conversely, in other embodiments, the computing system 118 may be configured to control the operation of the pump 110 and/or the valve(s) 112 such that the bladder 102 within each basket assembly 54 is inflated to a first inflation level (e.g., a partially inflated state) as shown in FIG. 7 during normal, de-plugged operation. By inflating the bladder(s) 102 to the first inflation level, the ingress of field materials and debris into the interior cavity(ies) 80 of the basket assembly(ies) may be inhibited, thereby reducing the likelihood of plugging.

The remainder of the control logic 200 will be described in the context of de-plugging a single basket assembly 54 of the implement 10 for purposes of clarity and simplicity. However, the control logic 200 may be applied to any or all of the basket assemblies 54 on the implement 10 simultaneously such that, when it is determined that a given basket assembly 54 is plugged, the bladder 102 of the given basket assembly 54 is used to de-plug the given basket assembly 54.

Referring again to FIG. 5, at (204), the control logic 200 includes receiving sensor data indicative of plugging of a basket assembly of the agricultural implement. Specifically, as mentioned above, in several embodiments, the computing system 118 may be communicatively coupled to the sensor(s) 117 via the communicative link 120. In this respect, as the implement/vehicle 10/12 travels across the field, the computing system 118 may receive data from the sensor(s) 117. Such data may, in turn, be indicative of whether the basket assembly 54 is plugged. In this respect, and as will be described below, the computing system 118 is configured to control the operation the pump 110 and/or the valve(s) 112 to inflate or deflate the bladder 102 based on the received sensor data.

Furthermore, at (206), the control logic 200 includes determining when the basket assembly is plugged based on the received sensor data. Specifically, in several embodiments, the computing system 118 is configured to analyze the sensor data received at (204) to determine when the basket assembly 54 is plugged. As indicated above, the basket assembly 54 is plugged when a sufficient amount of field materials and/or debris have accumulated on the blades 76 or within the interior cavity(ies) 80 of the basket assembly 54 such that its operation is hindered. When it is determined that the basket assembly 54 is plugged, the control logic 200 proceeds to (208). Conversely, the control logic 200 returns to (204) when it is determined that the basket assembly 54 is not plugged.

Figure 8:
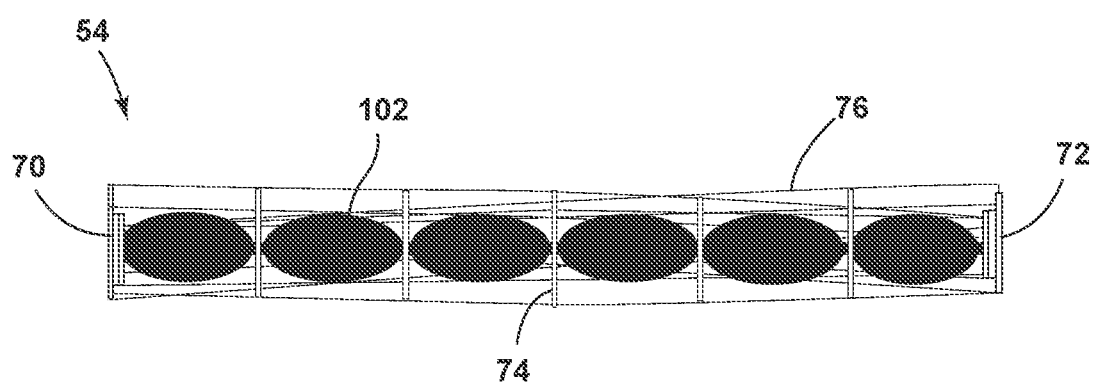
FIG. 8 illustrates a diagrammatic view of one embodiment of a bladder positioned within a basket assembly of an agricultural implement in accordance with aspects of the present subject matter, particularly illustrating the bladder being inflated to a second inflation level.

At (208), the control logic 200 includes controlling the operation of a pump and/or a valve such that a bladder within the basket assembly is inflated when it is determined that the basket assembly is plugged. Specifically, in several embodiment, when it determined that the basket assembly 54 is plugged at (206), the computing system 118 is configured to control the operation of the pump 110 and/or the valve(s) 112 such the bladder 102 is inflated. For example, in embodiments in which that bladder 102 is in a deflated state during normal, de-plugged operation, the computing system 118 may control the operation of the pump 110 and/or the valve(s) 112 such the bladder 102 is inflated to a second inflation level (e.g., a fully inflated state) as shown in FIG. 8. Similarly, in embodiments in which that bladder 102 is inflated to the first inflation level during normal, de-plugged operation, the computing system 118 may control the operation of the pump 110 and/or the valve(s) 112 such the bladder 102 is inflated to the second inflation level (e.g., the fully inflated state) as shown in FIG. 8. As shown in FIGS. 7 and 8, the second inflation level is greater than the first inflation level. Inflating the bladder 102 at (208) reduces the size of the interior cavity(ies) 80 of the basket assembly 54, thereby forcing field materials and/or debris that have accumulated on the blades 76 or within the interior cavity(ies) of the basket assembly 54 outward (e.g., radially) through the void 82 to de-plug the basket assembly 54.

Referring again to FIG. 5, at (210), after the bladder is inflated, the control logic 200 includes receiving sensor data indicative of plugging of the basket assembly. Specifically, in several embodiments, after the bladder 102 is inflated at (208), the computing system 118 is configured to receive sensor data indicative of plugging of the basket assembly 54. (210) is similar to or the same as (204). In fact, in some embodiments, the computing system 118 may receive sensor data indicative of plugging of the basket assembly 54 through out the agricultural operation, such as at a predetermined sampling rate.

Additionally, at (212), the control logic 200 includes determining when the basket assembly is de-plugged based on the received sensor data. Specifically, in several embodiments, the computing system 118 is configured to analyze the sensor data received at (210) to determine when the basket assembly 54 is de-plugged. In general, the basket assembly 54 is de-plugged when a sufficient amount of the field materials and/or debris that have accumulated on the blades 76 or within the interior cavity(ies) 80 of the basket assembly 54 has been removed such that the operation the basket assembly 54 is no longer hindered. When it is determined that the basket assembly 54 is de-plugged, the control logic 200 proceeds to (214). Conversely, the control logic 200 returns to (210) when it is determined that the basket assembly 54 is not de-plugged.

At (214), the control logic 200 includes controlling the operation of the valve such that the bladder is deflated when it is determined that the basket assembly is de-plugged. Specifically, in several embodiments, when it determined that the basket assembly 54 is de-plugged at (212), the computing system 118 is configured to control the operation of the valve(s) 112 such the bladder 102 is deflated. For example, in embodiments in which that bladder 102 is in a deflated state during normal, de-plugged operation, the computing system 118 may control the operation of the valve(s) 112 such the bladder 102 is deflated to the deflated state as shown in FIG. 6. Conversely, in embodiments in which that bladder 102 is inflated to the first inflation level during normal, de-plugged operation, the computing system 118 may control the operation of the valve(s) 112 such the bladder 102 is deflated to the first inflation level as shown in FIG. 7. Deflating the bladder 102 at (214) reduces the weight of the basket assembly 54 to improve its operation when de-plugged.

Figure 9:
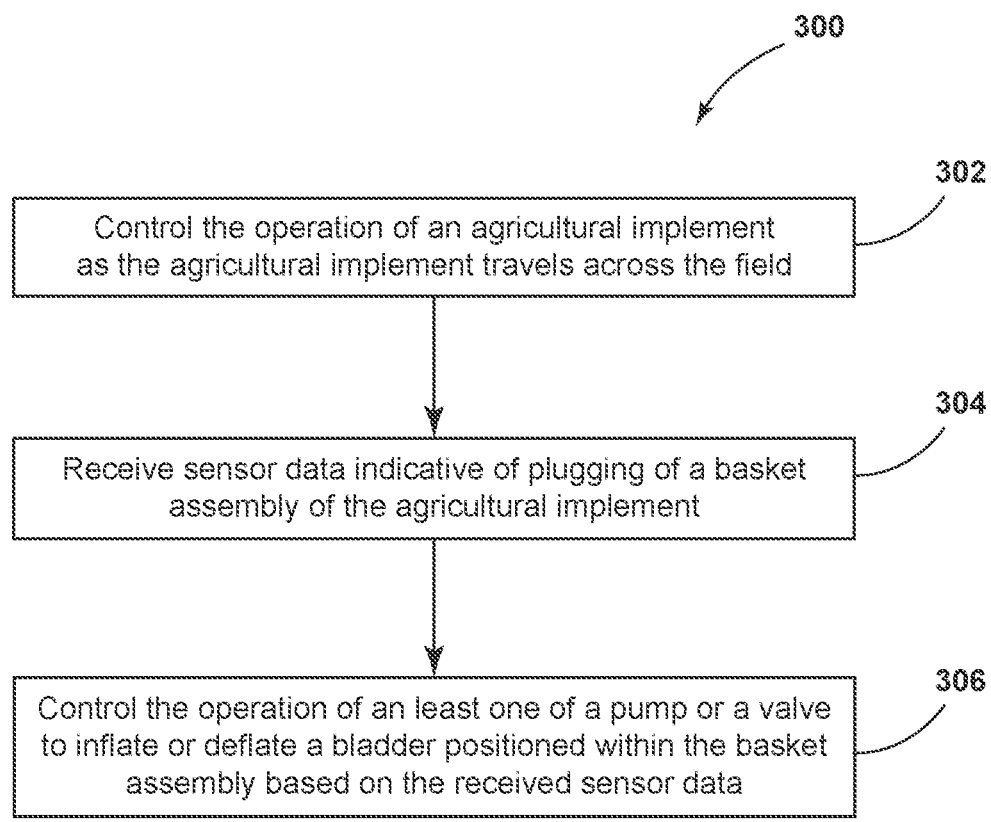
FIG. 9 illustrates a flow diagram of one embodiment of a method for de-plugging basket assemblies of an agricultural implement in accordance with aspects of the present subject matter.

Referring now to FIG. 9, a flow diagram of one embodiment of a method 300 for de-plugging basket assemblies of an agricultural implement is illustrated in accordance with aspects of the present subject matter. In general, the method 300 will be described herein with reference to the agricultural implement 10, the work vehicle 12, and the system 100 described above with reference to FIGS. 1-8. However, it should be appreciated by those of ordinary skill in the art that the disclosed method 300 may generally be implemented with any agricultural implement having any suitable implement configuration, with any work vehicle having any suitable vehicle configuration, and/or within any system having any suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (302), the method 300 may include controlling, with a computing system, the operation of an agricultural implement as the agricultural implement travels across the field. For instance, as described above, the computing system 118 may be configured to control the operation of the agricultural implement 10 as the agricultural implement 10 travels across the field, such as to perform an agricultural operation (e.g., a tillage operation) thereon.

Additionally, at (304), the method 300 may include receiving, with the computing system, sensor data indicative of plugging of the basket assembly. For instance, as described above, the computing system 118 may be configured to receive sensor data indicative of plugging of the basket assembly(ies) 54 of the agricultural implement 10 from the sensor(s) 117 via the communicative link 120.

Moreover, as shown in FIG. 9, at (306), the method 300 may include controlling, with the computing system, the operation of at least one of a pump or a valve to inflate or deflate a bladder within the basket assembly based on the received sensor data. For instance, as described above, the computing system 118 may be configured to control the operation of the pump 110 and/or the valve(s) 112 to inflate or deflate the bladder(s) 102 of the basket assembly(ies) 54 based on the received sensor data.

It is to be understood that the steps of the control logic 200 and the method 300 are performed by the computing system 118 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 118 described herein, such as the control logic 200 and the method 300, is implemented in software code or instructions which are tangibly stored on a tangible computer readable medium. The computing system 118 loads the software code or instructions via a direct interface with the computer readable medium or via a wired and/or wireless network. Upon loading and executing such software code or instructions by the computing system 118, the computing system 118 may perform any of the functionality of the computing system 118 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural implement, comprising:
   a frame;
   a basket assembly supported on the frame, the basket assembly including a plurality of circumferentially arranged blades such that the basket assembly is configured to roll relative to a surface of a field as the agricultural implement travels across the field, the plurality of circumferentially arranged blades defining a plurality of voids and at least partially defining an interior cavity within the basket assembly, each void being defined between an adjacent pair of the plurality of circumferentially arranged blades;
   a bladder positioned within the interior cavity, the bladder configured to be inflated and deflated such that the bladder expands and contracts relative to the plurality of circumferentially arranged blades to force field materials present within the interior cavity outward through the plurality of voids; and a sleeve positioned around the bladder.

2. The agricultural implement of claim 1, wherein the basket assembly further includes a plurality of support plates coupled to the plurality of circumferentially arranged blades, the plurality of support plates being spaced apart from each other such that a plurality of basket sections of the basket assembly is defined, the bladder further configured to expand and contract relative to the plurality of support plates when inflated and deflated.

3. The agricultural implement of claim 1, further comprising:

a pump configured to generate pressurized air to inflate the bladder relative to the plurality of circumferentially arranged blades.

4. The agricultural implement of claim 3, further comprising:

a valve configured to control a flow of the pressurized air at least one of to or from the bladder to inflate and deflate the bladder.

5. A system for de-plugging basket assemblies of an agricultural implement, the system comprising:

a basket assembly including a plurality of circumferentially arranged blades such that the basket assembly is configured to roll relative to a surface of a field as the agricultural implement travels across the field, the plurality of circumferentially arranged blades defining a plurality of voids and at least partially defining an interior cavity within the basket assembly, each void being defined between an adjacent pair of the plurality of circumferentially arranged blades; and a bladder positioned within the interior cavity, the bladder configured to be inflated and deflated such that the bladder expands and contracts relative to the plurality of circumferentially arranged blades to force field materials present within the interior cavity outward through the plurality of voids; and a pump configured to generate pressurized air to inflate the bladder relative to the plurality of circumferentially arranged blades.

6. The system of claim 5, wherein the basket assembly further includes a plurality of support plates coupled to the plurality of circumferentially arranged blades, the plurality of support plates being spaced apart from each other such that a plurality of basket sections of the basket assembly is defined, the bladder further configured to expand and contract relative to the plurality of support plates when inflated and deflated.

7. The system of claim 5, further comprising:
a sleeve positioned around the bladder.

8. The system of claim 5, further comprising:
a valve configured to control a flow of the pressurized air at least one of to or from the bladder to inflate and deflate the bladder.

9. The system of claim 5, further comprising:
a sensor configured to generate data indicative of plugging of the basket assembly; and
a computing system communicatively the sensor, the computing system configured to control the operation of at least one of the pump and the valve based on the data generated by the sensor.

10. The system of claim 9, wherein, when controlling the operation of the at least one of the pump or the valve, the computing system is configured to:

determine when the basket assembly is plugged based on the data generated by the sensor; and control the operation of the at least one of the pump or the valve such that the bladder is inflated when it is determined that the basket assembly is plugged.

11. The system of claim 10, wherein, when controlling the operation of the at least one of the pump or the valve, the computing system is further configured to:

determine when the basket assembly is de-plugged based on the data generated by the sensor after the bladder is inflated; and control the operation of the valve such that the bladder is deflated when it is determined that the basket assembly is de-plugged.

12. The system of claim 9, wherein the computing system is further configured to control the operation of the at least one of the pump or the valve such that the bladder is inflated to a first inflation level during de-plugged operation.

13. The system of claim 12, wherein, when controlling the operation of the at least one of the pump or the valve, the computing system is configured to:

determine when the basket assembly is plugged based on the data generated by the sensor; and control the operation of the at least one of the pump or the valve such that the bladder is inflated from the first inflation level to a second inflation level when it is determined that the basket assembly is plugged, the second inflation level being greater than the first inflation level.

14. A method for de-plugging basket assemblies of an agricultural implement, the agricultural implement including a basket assembly and a bladder positioned within the basket assembly, the bladder configured to be inflated and deflated such that the bladder expands and contracts relative to the basket assembly, the method comprising:

controlling, with a computing system, an operation of the agricultural implement as the agricultural implement travels across the field;

receiving, with the computing system, sensor data indicative of plugging of the basket assembly; and controlling, with the computing system, an operation of at least one of a pump or a valve to inflate or deflate the bladder based on the received sensor data.

15. The method of claim 14, wherein controlling the operation of the at least one of the pump or the valve comprises:

determining, with the computing system, when the basket assembly is plugged based on the received sensor data; and controlling, with the computing system, the operation of the at least one of the pump or the valve such that the bladder is inflated when it is determined that the basket assembly is plugged.

16. The method of claim 15, wherein controlling the operation of the at least one of the pump or the valve further comprises:

determining, with the computing system, when the basket assembly is de-plugged based on the received sensor data after the bladder is inflated; and controlling, with the computing system, the operation of the valve such that the bladder is deflated when it is determined that the basket assembly is de-plugged.

17. The method of claim 14, wherein controlling the operation of the agricultural implement comprises controlling, with the computing system, the operation of the at least one of the pump or the valve such that the bladder is inflated to a first inflation level during de-plugged operation.

18. The method of claim 17, wherein controlling the operation of the at least one of the pump or the valve comprises:
- determining, with the computing system, when the basket assembly is plugged based on the received sensor data; and
- controlling, with the computing system, the operation of the at least one of the pump or the valve such that the bladder is inflated from the first inflation level to a second inflation level when it is determined that the basket assembly is plugged, the second inflation level being greater than the first inflation level.

\* \* \* \* \*